United States Patent [19]

Wang et al.

[11] 3,971,748

[45] July 27, 1976

[54] GRAPHITE POWDER-POLYPHENYLENE MIXTURES AND COMPOSITES

[75] Inventors: Chen-Shen Wang, Naperville; Eli W. Blaha, Wheaton, both of Ill.

[73] Assignee: Standard Oil Company, Chicago, Ill.

[22] Filed: Oct. 7, 1975

[21] Appl. No.: 620,317

[52] U.S. Cl. .......................... 260/37 R; 136/120 FC
[51] Int. Cl.² .......................................... C08L 65/02
[58] Field of Search .......................... 260/37 R, 2 H; 136/120 FC

[56] References Cited

UNITED STATES PATENTS 3,600,341   8/1971   Schmidt et al. ............... 260/37 R X

*Primary Examiner*—Lewis T. Jacobs
*Attorney, Agent, or Firm*—Wallace L. Oliver; Arthur G. Gilkes; William T. McClain

[57] ABSTRACT

Moldable resin mixtures comprising branched soluble polyphenylenes and graphite powder are useful as plates in acid electrolytic fuel cells and in other applications.

10 Claims, No Drawings

GRAPHITE POWDER-POLYPHENYLENE MIXTURES AND COMPOSITES

BACKGROUND OF THE INVENTION

This invention relates to moldable resin mixtures comprising polyphenylenes and graphite powder.

There has been a long felt need for polymeric compositions which can be used in extreme environmental conditions such as prolonged exposure to heat and acid. One application in which such a composition is required is in plates used in acid electrolytic fuel cells. Generally, suitable plate compositions must be electrically conductive and stable in concentrated acid solutions at temperatures about 200°F. for extended periods of time. An example of a plate structure useful fuel cells is described in Dews et al. U.S. Pat. No. 3,801,374, incorporated herein by reference, in which a plate was fashioned from a graphite powder-vinylidene fluoride resin.

We have found that a graphite powder-branched polyphenylene composite formed by compression molding without solvent produces a superior plate useful in fuel cells. Such plates can withstand over 3000 hours in 100% phosphoric acid at 400°F. and 0.9 volts applied electrical potential with only minimal weight loss.

In general, polyphenylenes are composed essentially of carbon and hydrogen in aromatic ring type structures, with the rings chemically linked to each other through the ortho, meta and para positions. Such polymers are to be distinguished clearly from other chemically similar phenylene type structures, such as polyphenylene oxide, polyphenylene sulfide, polyphenylene sulfone and other polymers containing the designation "phenylene". Polyphenylenes have generally been produced by techniques such as acid catalyzed oxidative coupling of the benzene ring in various aromatic compounds. The polyphenylenes produced by these processes possess some degree of high temperature thermal stability, but they are generally linear (para-polyphenylene) polymers which are relatively insoluble and infusible. Polyphenylenes have been produced which do possess certain limited solubility, but these have generally been at number average molecular weights of only about 1000 to 2000. Generally, these low molecular weight polyphenylenes contain only a low degree of branching, that is, they are still relatively linear polymers which contain long linear segments.

The branched polyphenylenes useful in producing superior graphite powder composites are those novel polyphenylenes disclosed by Wennerberg and Wang in U.S. Pat. No. 3,792,099 and produced by the process described in U.S. Pat. Nos. 3,829,518 and 3,798,281, all of these patents incorporated by reference herein. These polyphenylenes possess increased solubility over prior art polyphenylenes and excellent thermal stability over a number average molecular weight range from 1000 to over 10,000. Also, small amounts of branched nitropolyphenylene can be incorporated within the composites of our invention. Such nitropolyphenylenes are described in U.S. patent application Ser. No. 529,855 filed Dec. 5, 1974, which is incorporated by reference herein.

SUMMARY OF OUR INVENTION

Our invention comprises a moldable resin mixture comprising:

a. about 25 to 95% graphite powder;

b. about 5 to 75% branched polyphenylene comprising benzene ring structures bonded onto a polymer chain wherein the linear infrared absorbance spectrum integrated peak area within the frequency range 726–930 $cm^{-1}$ is distributed as follows: from 10 to 18% of the integrated peak area is within the frequency range 854–930 $cm^{-1}$, from 15 to 30% is within the frequency range 806–853 $cm^{-1}$, from 13 to 20% is within the frequency range 778–805 $cm^{-1}$, and the remainder of the integrated peak area within the frequency range 726–930 $cm^{-1}$ is within the frequency range 726–777 $cm^{-1}$; and c. 0 to about 30% branched nitropolyphenylene comprising benzene ring structures bonded into a polymer chain and from 0.25 to 15 percent by weight of nitrogen wherein infrared absorbance occurs at frequencies of about 1345 $cm^{-1}$ and about 1525 $cm^{-1}$ and at least 8% of the linear infrared absorbance spectrum integrated peak area within the frequency range 726–930 $cm^{-1}$ is within the frequency range 865–930 $cm^{-1}$.

BRIEF DESCRIPTION OF THE INVENTION

Moldable resin mixtures of our invention, described above, are useful in forming composites. These composites of our invention comprise graphite powder bonded with polyphenylenes. More specifically our composites comprise about 25 to 95% graphite powder, about 5 to 75% branched polyphenylene and 0 to about 30% nitropolyphenylene. For use under prolonged highly acidic conditions, such as in fuel cell plates, our composites should contain about 85 to 95% graphite powder, about 5 to 15% branched polyphenylene and less than about 5% nitropolyphenylene. The preferable fuel cell plate composite contains about 90% graphite powder and about 10% branched polyphenylene. All percentages are in weight percent.

Generally, as the amount of graphite powder is decreased and correspondingly the quantity of polyphenylene is increased, the composite's toughness, impact strength, and pliability is enhanced up to about 15% resin, after which point acid resistance will decrease. Thus, a mechanical seal fitted into a compressor or pump not subject to prolonged acid exposure can be fashioned from a composite preferably having about 40 to 70% graphite powder, about 30 to 60% branched polyphenylene and 0 to about 10% nitropolyphenylene. Such a mechanical seal element is self-lubricating.

Branched polyphenylene useful in this invention should have at least about 8% by weight of its benzene ring structures bonded to three or more other benzene ring structures, that is, it should be at least 8% branched. Such branched polyphenylene can also be characterized by the relative amounts of the linear infrared absorbance spectrum integrated peak area within the frequency range 726–930 $cm^{-1}$. In general, about 7 to 18%, preferably 10 to 18%, of the total integrated peak area within the frequency range 726–930 $cm^{-1}$ should fall within the frequency range 854–930 $cm^{-1}$ (I region). The frequency range 806–853 $cm^{-1}$ (P region) generally accounts for about 15 to 30%, preferably 18 to 26%, of the total integrated peak area. The frequency range 778–805 $cm^{-1}$ (M region) accounts for about 13 to 20% of the total integrated peak area.

Branched polyphenylene can alternatively be characterized by the amount of the various types of benzene ring structures present in the polymer chains, which is determined according to the following equation:

$$c = \frac{A}{(b\, a^*)}$$

In this equation, $A$ is the planimeter area reading for the particular absorption frequency range corrected by a constant factor relating to the planimeter used in the measurement and is in units of cm$^{-1}$. The values of $A$ for the region between 854 and 930 cm$^{-1}$ are corrected for the presence of meta-disubstituted benzene ring structures by applying a correction factor obtained from the value of $A$ for the region 778–805 cm$^{-1}$. The correction factor is one-third of the $A$ value for the 778–805 cm$^{-1}$ region. The term $b$ is the thickness of the KBr pellet in units of cm. The term $a^*$ is the integrated absorptivity in units of g$^{-1}$ 1 cm$^{-2}$. The values for $a^*$ are obtained from the integrated peak areas of the reference compounds determined under essentially the same operating conditions used for obtaining the spectra for the polyphenylenes. The term $c$ is the concentration, in grams per liter, of any of the characteristic benzene ring structures associated with the regions I, P, M and PH. The amount of the various types of benzene ring structures present in the polymer chain is determined by dividing the measured concentration obtained from a particular frequency range by the sum of the concentrations obtained from the four frequency ranges involved. Further details of this procedure are described in U.S. Pat. No. 3,792,099.

By the above-described analysis, the amount of benzene ring structures in the branched polyphenylene polymer chains which are at least trisubstituted, that is, bonded to three or more other benzene ring structures, is at least about 8% by weight, preferably 10% by weight and is more preferably from about 12 to about 25 percent by weight. The amount of benzene ring structures which are disubstituted, bonded to two other benzene ring structures through either the para, meta, or ortho positions, is preferably from about 45 to about 65 percent by weight. The amount of benzene ring strucutres which are meta-disubstituted, bonded through the meta position to two other benzene ring structures, is preferably from about 15 to about 35 percent by weight. The terminology "double bonding through the meta position" refers to the bonding of a benzene ring structure to two other benzene ring structures through the meta positions of the benzene ring structure. The remaining benzene ring structures in the polymer chains are bonded to only one other benzene ring structure.

The inherent viscosity of the branched polyphenylenes can vary from about 0.025 or less to more than 0.17 when measured in trichlorobenzene at 135°C. at a concentration of 0.02 g/ml. This roughly corresponds to a number average molecular weight range of from 1000 or less to greater than 10,000. A number average molecular weight range of about 3,000 to 10,000 is particularly advantageous for the preparation of the nitropolyphenylenes of this invention.

A particularly preferred branched polyphenylene resin is that prepared from biphenyl by the dehydrogenative coupling process described in U.S. Pat. Nos. 3,829,518 and 3,798,281.

Branched polyphenylene can be converted to branched nitropolyphenylene useful in this invention by a nitration reaction. A preferred nitration reaction consists of the addition of a mixed nitric acid and sulfuric acid nitrating agent to a solution consisting of the branched polyphenylene, water and sulfuric acid. This reaction is preferably conducted at from 0°C. to 50°C for from 3 hours to 10 hours, more preferably from about 5°–15°C. for about 2 to 4 hours followed by a few hours at a temperature of about 30°–50°C.

The branched nitropolyphenylenes of this invention also contain at least 0.25 percent by weight of nitrogen and at least about 0.58 percent by weight of oxygen. The nitropolyphenylenes exhibit infrared absorbance at both 1345 cm$^{-1}$ and 1525 cm$^{-1}$ which indicate the presence of nitro groups. Preferably, the branched nitropolyphenylene will have a softening point between 150°C. and 350°C., and it will contain at least 0.5 percent nitrogen and at least 1.15 percent oxygen, and no more than about 15 percent nitrogen and about 35 percent oxygen. More preferably, the amount of nitrogen contained in the polymer will be from 0.75 percent to 5 percent and most preferably from 1 to 4 percent.

Using the integrated peak area obtained from linear infrared absorption spectra for the region from about 600 cm$^{-1}$ to 1000 cm$^{-1}$, it has been determined that the branched nitropolyphenylene of this invention must have at least 8 percent of the linear infrared absorbance spectrum integrated peak area in the frequency range 726–930 cm$^{-1}$ within the I frequency range 865–930 cm$^{-1}$. It is this type of absorption which is indicative of polymer chain branching.

Preferably, the total linear infrared absorbance spectrum integrated peak area within the frequency range 726–930 cm$^{-1}$ is distributed as follows: from 8 to 22%, most preferably from 12 to 20%, of the integrated peak area falls within the frequency range 865–930 cm$^{-1}$; from 20 to 45%, most preferably from 25 to 40%, of the integrated peak area falls within the frequency range 806–864 cm$^{-1}$; from 7 to 20%, most preferably from 10 to 18%, of the integrated peak area falls within the frequency range 778–805 cm$^{-1}$; and the remainder of the integrated peak area within the frequency range 726–930 cm$^{-1}$ falls within the frequency range 726–777 cm$^{-1}$.

Perferably, the branched nitropolyphenylene has an inherent viscosity of at least 0.04 when measured in trichlorobenzene at 135°C. at a concentration of 0.02 g/ml. The number average molecular weights of the nitropolyphenylene range from as low as 1000 to greater than 10,000, and are preferably greater than about 4000.

Unlike graphite and carbon fiber composites using polyphenylenes, graphite powder-polyphenylene composites can be prepared by dry molding, which is simpler, quicker and less expensive than the solvent casting method used in forming fiber composites and avoids any residual solvent in the final composite. A preferred method of preparation is to blend graphite powder and polyphenylene (either branched polyphenylene alone or a mixture with nitropolyphenylene) in a Waring blender for at least 5 minutes. This blend is compacted into a pressing mold which is inserted into a wall ventilatd press. Useful molding conditions range from about 600° to 950°F. at about 1600 to 8000 p.s.i. for about 5 to 30 minutes. Typically, as the amount of polyphenylene in a mixture is increased, the temperature required to form a suitable composite must be decreased. The effect of various mixture compositions and molding conditions are shown in Table IV.

Our invention is demonstrated but not limited by the following examples.

EXAMPLE I

Into a stirred autoclave there was charged 20 grams of a $MoO_3 \cdot SiO_2 \cdot Al_2O_3$ catalyst, 1000 grams of biphenyl and 300 psig of hydrogen. Constant heat input conditions were applied until the temperature reached 900°F. at which time the heat input was reduced. The reaction was continued for 5-½ hours during which time the maximum temperature was 1070°F. and the maximum pressure was 1785 psig. The inherent viscosity of the worked-up polyphenylene product was 0.14 in trichlorobenzene at 135°C. at 0.02 g/l using a Cannon-Ubbelohcle viscometer. The softening point was about 210°C.

A linear absorbance infrared spectra was obtained (Perkin-Elmer Model 180) and analyzed in accordance with the procedure outlined in U.S. Pat. No. 3,792,099 using the constant factor to convert the planimeter readings to the values of A as $1/20.75$ $cm^{-1}$. The integrated absorptivity values ($a^*$, in units of $g^{-1}$ $l$ $cm^{-2}$) were as follows: Region I—13.04, P—17.15, M—12.86, and PH—40.27. The resin concentration in the KBr pellet was 28.66 g/l which had a thickness of 0.0566 cm. The normalized weight percents attributable to each of the characteristic benzene ring structures is shown in Table I. The percent recovery was 101.6%.

TABLE I

| Region[1] | Planimeter Area ($cm^2$) | Integrated Area (%) | A/b ($cm^{-2}$) | c (g/l) | Normalized Weight Percent |
|---|---|---|---|---|---|
| I | 126.0 | | | | |
| I[2] | 86.2 | 12.2 | 73.34 | 5.62 | 19.30 |
| P | 178 | 25.3 | 151.45 | 8.83 | 30.32 |
| M | 119.5 | 17.0 | 101.67 | 7.90 | 27.13 |
| PH | 320.5 | 45.5 | 272.69 | 6.77 | 23.25 |

[1]As described and defined in U.S. 3,792,099.
[2]Corrected as indicated in U.S. 3,792,099.

A portion of the polyphenylene prepared above was ground and powdered to under 200 mesh. In a blender, 197.1 grams of graphite powder (A. Daigger, Chicago, Illinois) was blended for 5 minutes with 27.9 grams of the powdered polyphenylene. This mixture was compacted in a 7 × 7 inches mold for pressing. The mold was inserted into a press (Pasadena Hydraulics) having a platen temperature of 950°F. A pressure of 3,200 psi was applied and then quickly released to remove air from the pre-preg. Pressure was again applied and was released three times at 5-minute intervals after the temperature equilibrated to 950°F. Total pressing time was 30 minutes at 950°F. The ⅛-inch thick composite was cooled to 100°F. in the mold while the pressure was maintained. The flexural strength was 4,900 psi and the flexural modulus was 2,290,000 psi. The composite had an electrical conductance similar to graphite.

EXAMPLE II

A nitropolyphenylene was prepared by placing 50 grams of branched polyphenylene prepared as in Example I into a stirred reaction container together with 700 milliliters of concentrated sulfuric acid and 140 milliliters of water. To this was added over a 1-hour period with stirring at 5°–10°C. a mixture of 9.8 milliliters of concentrated sulfuric acid and 4.2 milliliters of nitric acid (Sp. gr. 1.42). The reaction mixture was maintained for an additional 3 hours at 5°–10°C. and for 4 more hours at 40°C. The dark solid product was washed to neutrality with distilled water and dried at 120°C. under vacuum. The nitropolyphenylene product had a softening point of about 185°C. and an inherent viscosity of 0.05 at 135°C. in trichlorobenzene at 0.2 g/l ml. The elemental analysis was N, 0.93%; 0, 2.33%; C, 91.79% and H, 4.88%. Infrared absorbance was observed at 1345 $cm^{-1}$ and 1525 $cm^{-1}$.

A linear absorbance spectrum was obtained from a KBr pellet prepared according to the procedure described in Example I. The KBr pellet concentration was 24.80 g/l and thickness was 0.0496 cm. The planimeter integrated peak areas and percent of the integrated peak area associated with each region is shown in Table II.

TABLE II

| Region | Planimeter Area | % Integrated Area |
|---|---|---|
| I (865–930 $cm^{-1}$) | 60.9 | 12.6 |
| P (806–864 $cm^{-1}$) | 115 | 23.7 |
| M | 74 | 15.3 |
| PH | 235 | 48.5 |

In a blender, 92 grams of graphite powder was blended for 5 minutes with 8 grams of the unmodified branched polyphenylene described in Example I and 4 grams of the nitropolyphenylene described above. Both the unmodified polyphenylene and the nitropolyphenylene were powdered to under 200 mesh and blended together for 10 minutes before being blended with the graphite powder. This mixture was compacted in a 7 × 7 inches mold for pressing. The mold was inserted into a press with a platen temperature of 950°F., and a pressure of 3,200 psi was applied and quickly released to remove air from the prepreg. Pressure was again applied and released three times at 5-minute intervals after the temperature equilibrated to 950°F. Total pressing time at 950°F. was 30 minutes. The 1/16-inch thick composite was cooled to 100°F. in the mold while the pressure was maintained. The composite had a heat distortion temperature of more than 540°F. at 264 psi. The flexural strength was 4,600 psi and the flexural modulus was 1,809,000 psi. The composite had an electrical conductance similar to graphite.

EXAMPLE III

In a manner similar to that described in Examples I and II above, a composite was made from 67 parts of graphite powder, 23 parts of the unmodified branched polyphenylene described in Example I and 10 parts of the nitropolyphenylene of Example II. Essentially the same molding procedure was used as in Examples I and II. This composite also had a heat distortion temperature of more than 540°F. at 264 psi and had a flexural strength of 4,900 psi and a flexural modulus of 1,683,000. The composite had an electrical conductivity similar to graphite.

EXAMPLE IV

A branched polyphenylene-graphite powder composite was formed in a 2 × 2.5 inches mold using 2 grams of polyphenylene (inherent viscosity 0.07) and 18 grams of graphite powder. The sample was prepared in a manner similar to that described in Example I using a platen temperature of 950°F., a pressure of 3,200 psi and a total pressing time of 30 minutes.

This ⅛-inch thick composite was placed in a bath containing 100% phosphoric acid at 400°F. An electrical potential of 0.9 volts was applied across the composite. The results of this test are shown in Table III.

TABLE III

| Exposure Time (hours) | Total Weight Loss (%) |
|---|---|
| 240 | 1.6 |
| 500 | 1.6 |
| 1000 | 1.6 |
| 3000 | 0.4* |

*The increase in weight is attributed to failure to wash out all phosphoric acid before weighing.

EXAMPLES V–XXVI

A series of polyphenylene-carbon powder composites were formed using the method described in Examples I and II. The results are given in Table IV.

TABLE IV

| Example | Graphite Powder (%) | Branched Poly-phenylene (%) | Inherent Viscosity of Poly-phenylene | Nitropoly-phenylene (%) | Molding Conditions Temp. (°F.) | Pressure (psi) | Total Time (Minutes) | Density (g/ml) | Flexural Strength (psi) | Flexural Modulus (psi) |
|---|---|---|---|---|---|---|---|---|---|---|
| V | 90 | 10 | 0.10 | 0 | 950 | 3200 | 30 | — | 3400 | 1,373,000 |
| VI | 90 | 10 | 0.07 | 0 | 750 | 3200 | 10 | — | 3100 | 1,015,000 |
| VII | 90 | 10 | 0.10 | 0 | 750 | 3200 | 10 | — | 1900 | 1,130,000 |
| VIII | 85 | 15 | 0.07 | 0 | 750 | 3200 | 10 | — | 2200 | 1,263,000 |
| IX | 90 | 10 | 0.10 | 0 | 750 | 3200 | 10 | — | 3100 | 1,015,000 |
| X | 90 | 10 | 0.07 | 0 | 750 | 3200 | 10 | — | 1900 | 1,130,000 |
| XI[1] | 90 | 10 | 0.08 | 0 | 950 | 3200 | 30 | 1.62 | 3200 | 1,546,000 |
| XII | 90 | 10 | 0.10 | 0 | 950 | 6400 | 30 | 1.95 | 3000 | 1,307,000 |
| XIII | 90 | 10 | 0.10 | 0 | 950 | 6400 | 10 | 1.82 | 3000 | 1,680,000 |
| XIV | 90 | 10 | 0.10 | 0 | 750 | 6400 | 30 | 1.82 | 3300 | 1,534,000 |
| XV | 90 | 10 | 0.10 | 0 | 750 | 6400 | 10 | 2.00 | 2800 | 1,354,000 |
| XVI | 90 | 7 | 0.08 | 3[2] | 950 | 6400 | 30 | 1.68 | 4200 | 1,456,000 |
| XVII | 90 | 7 | 0.08 | 3[2] | 950 | 6400 | 10 | 1.74 | 2000 | 959,000 |
| XVIII | 90 | 7 | 0.08 | 3[2] | 750 | 6400 | 30 | 1.70 | 1600 | 811,000 |
| XIX | 90 | 7 | 0.08 | 3[2] | 750 | 6400 | 10 | 1.63 | 1600 | 808,000 |
| XX | 90 | 10 | 0.09 | 0 | 950 | 3200 | 30 | — | 4300 | 1,670,000 |
| XXI | 50 | 50 | 0.08 | 0 | 600 | 1000 | 10 | — | 1400 | 859,000 |
| XXII | 25 | 75 | 0.08 | 0 | 600 | 1000 | 10 | — | —Broke— | |
| XXIII | 70 | 20 | 0.08 | 10[3] | 950 | 1600 | 10 | — | 2600 | 1,354,000 |
| XXIV | 70 | 30 | 0.07 | 0 | 950 | 1600 | 10 | — | 2900 | 1,292,000 |
| XXV | 25 | 65 | 0.08 | 10[3] | 600 | 1600 | 10 | — | —Broke— | |
| XXVI | 70 | 30 | 0.08 | 0 | 950 | 3200 | 30 | — | No Composite | |

[1]Composite similar to Example IV.
[2]Nitrogen content = 1.1%
[3]Nitrogen content = 1.7%

Using the teachings of this disclosure a graphite powder-resin composite can be produced using branched polyphenylene resin, which can withstand extreme conditions while maintaining good physical properties.

We claim:
1. A moldable resin mixture comprising:
   a. about 25 to 95% graphite powder;
   b. about 5 to 75% branched polyphenylene comprising benzene ring structures bonded into a polymer chain wherein the linear infrared absorbance spectrum integrated peak area within the frequency range 726–930 $cm^{-1}$ is distributed as follows: from 10 to 18% of the integrated peak area is within the frequency range 854–930 $cm^{-1}$, from 15 to 30% is within the frequency range 850–853 $cm^{-1}$, from 13 to 20% is within the frequency range 778–805 $cm^{-1}$, and the remainder of the integrated peak area within the frequency range 726–930 $cm^{-1}$ is within the frequency range 726–777 $cm^{-1}$; and
   c. 0 to about 30% branched nitropolyphenylene comprising benzene ring structures bonded into a polymer chain and from 0.25 to 15 percent by weight of nitrogen wherein infrared absorbance occurs at frequencies of about 1345 $cm^{-1}$ and about 1525 $cm^{-1}$ and at least 8% of the linear infrared absorbance spectrum integrated peak area within the frequency range 726–930 $cm^{-1}$ is within the frequency range 856–930 $cm^{-1}$.

2. The moldable resin mixture of claim 1 comprising about 85 to 95% graphite powder and about 5 to 15% branched polyphenylene and less than about 5% nitropolyphenylene.

3. A composite formed from the mixture of claim 1.

4. A composite formed from the mixture of claim 2.

5. An electrically conductive fuel cell plate formed from the composite of claim 4.

6. The moldable resin mixture of claim 1 comprising about 90% graphite powder and about 10% branched polyphenylene.

7. The composite formed from the mixture of claim 6.

8. An electrically conductive fuel cell plate formed from the composite of claim 7.

9. A composite formed from the mixture of claim 1 containing about 40 to 70% graphite powder, about 30 to 60% branched polyphenylene and 0 to about 10% nitropolyphenylene.

10. A mechanical seal element formed from the composite of claim 9.

* * * * *

UNITED STATES PATENT OFFICE
CERTIFICATE OF CORRECTION

Patent No. 3,971,748          Dated July 27, 1976

Inventor(s)  Chen-Shen Wang and Eli W. Blaha

It is certified that error appears in the above-identified patent and that said Letters Patent are hereby corrected as shown below:

Column 7, line 59  "850-853 $cm^{-1}$" should be -- 805-853 $cm^{-1}$

Signed and Sealed this
Nineteenth Day of October 1976

[SEAL]

Attest:

RUTH C. MASON
*Attesting Officer*

C. MARSHALL DANN
*Commissioner of Patents and Trademarks*